Patented Nov. 28, 1950

2,532,217

UNITED STATES PATENT OFFICE 2,532,217

DIRECT PRODUCTION OF LITHIUM BOROHYDRIDE

Paul F. Winternitz, New York, N. Y., assignor, by mesne assignments, to Allied Process Corporation, New York, N. Y., a corporation of New York No Drawing. Application October 20, 1945, Serial No. 623,607

9 Claims. (Cl. 23—14)

This invention relates to the formation of metal borohydrides, such as lithium borohydride, and it is based on my discovery that the desired end product may be obtained directly from a reaction between a suitable salt-like hydride and a boron halide.

The process of my invention resides in bringing a hydride and a halide together in a reaction zone, and so controlling the conditions of the reaction that the borohydride is formed in preference to the formation of another end product, such as diborane. In order to obtain the desired result, it is necessary that certain precautions be taken, and certain controls imposed. In the following description, I will present an illustrative and characteristic example of a way to practice the present invention, and will endeavor to discuss its salient features with reference to the known chemistry of related processes.

The reactivity of the saline hydrides and the boron halides is disclosed in a copending application of Sherman D. Lesesne, Serial No. 576,130, filed February 3, 1945, commonly assigned with the present application. He has shown that these compounds may react exothermally in either the dry or wet way, and that the wet method has certain advantages from the viewpoint of yields and facility of manipulation. In a preferred example, finely divided lithium hydride is suspended in an organic liquid in a suitable container, and boron fluoride is added thereto, either as a gas or in organic liquid, to produce diborane, which distills from the reaction chamber. Inorganic liquids, such as water, should be excluded, as otherwise the desired product would be decomposed. Organic liquids such as esters, ketones, and ethers may be employed as the suspending medium.

Lesesne concluded that of the various pairs of hydrides and halides which might be designated, the combination of lithium hydride and boron fluoride was the most efficacious, inasmuch as he was able to produce diborane of high purity and substantially quantitatively. He also indicated a preference for ethyl ether as the suspending liquid, because its low boiling point expedited the elimination of the gaseous diborane, and because it provided a suitable carrier for the boron fluoride, with which it forms the relatively high boiling complex, $(C_2H_5)_2O:BF_3$. The reaction, which proceeds rapidly at room temperature with generation of enough heat to cause the ether to boil, is expressed by the equation:

$$6LiH + 2BF_3 = B_2H_6 + 6LiF \tag{1}$$

In distinction, while the process of this invention employs the same starting materials, they are present in different proportions and they are made to yield a different end product, as expressed by this equation:

$$4LiH + BF_3 = LiBH_4 + 3LiF \tag{2}$$

Diborane is quite stable in the presence of boron fluoride, whereas lithium borohydride is not. In fact, boron fluoride will decompose the borohydride, to produce diborane, with almost explosive violence if the reaction is conducted in the dry way, as Lesesne has also disclosed in his copending application Serial No. 576,129. It is therefore quite apparent that, as between these two equations, there is an extremely strong tendency for the first to take place in preference to the second. Accordingly, a process based on Equation 2 must therefore involve certain factors which offset the instability of the borohydride, and render it sufficiently stable in the environment of the reaction zone to permit recovery.

I have discovered that the diborane reaction may be suppressed to a very substantial extent, and that if such suppression is effected at a suitable time, another reaction takes place which, upon available evidence, results in the formation of some one or more unstable compounds. These, if utilized while they retain their potency, encourage the formation of lithium borohydride, even in the presence of the other reagents. A material factor in bringing about this new result is the control of the heat of the reaction. A related factor has to do with the amount of boron fluoride which is presented to the mass of lithium hydride in the reaction zone. A third factor involves the formation of the unstable principle just alluded to, and which, in a sense, may be regarded as a result of the first two items.

Generally speaking, the best known method for directly producing the borohydride is instituted in much the same manner as the method for making diborane. One may equip a flask with reflux condenser, stirrer, and dropping funnel, charge the flask with an ether slurry of lithium hydride particles, and begin the addition of boron fluoride, either as a gas or as the ether complex. The characteristic reaction of Equation 1 tries to begin, but if the fluoride is added quite slowly, and if diborane promoters are not also charged into the flask, the reaction is not nearly so rapid. It is desirable, in this connection, to add the complex so slowly that the ether just barely simmers, is returned from the reflux condenser as a very slow rate, and only small amounts of gas are given off. Should the reaction begin to increase its rate, as shown by increasing gas liberation, cooling of the flask may be resorted to, and the rate of addition curtailed.

In the diborane process, the procedure has been to add the complex to the hydride as rapidly as it could be absorbed, thereby maintaining a good reaction rate and increasing the general efficiency. In the present process, this ought not be done if the best results are sought. Rather, after a fraction of the calculated amount of boron fluoride has been added in the slow manner stated, the addition is discontinued, and the flask contents are permitted to simmer quietly for a further period of time.

Those practicing this disclosure should now be advised to expect a surprising and interesting phenomenon. Frequently, although not always, the flask contents suddenly transform themselves from a mildly reacting mass into a surging turbulent liquid. Greatly increased amounts of gas are liberated, and the action may be so violent as to overtax the capacity of the condenser. At this point, or at such time as an experienced operator anticipates the occurrence of this effect, the flask contents are severely cooled from room temperature to whatever lower temperature is required to arrest the action. The cooling causes the surging action to subside, and to restore the flask contents to their previous state of comparative tranquility.

Provided the cooling is not too extreme, the simmering action will then continue for a further period of time. During this interval, the violent action will again take place if the flask is permitted to become warm, and the cooling should therefore be continued. After a while, however, the action stops except for the occasional liberation of a gas bubble, and the temperature may be allowed to increase once more. If nothing appears to happen, it may be assumed that the preliminary reaction has come to a practical end.

Thereafter, the addition of boron fluoride may be resumed, again slowly, and with recourse to cooling as required. Some diborane may now be formed, but for the most part there will be preferentially formed lithium borohydride, whose crystals may often be seen separating from the saturated ether solution. As long as there is a fair preponderance of lithium hydride in the flask, the borohydride is formed instead of diborane, but as the hydride is depleted, diborane is formed in increasing amounts. This may be due to the direct resumption of reaction (1), or the decomposition of the borohydride. In any event, the increase in diborane formation signals an end point for efficient recovery, and therefore the action is then stopped, the borohydride separated as an ether solution, and recovered therefrom.

While the evidence now available is inadequate to present an exhaustive theoretical explanation of the reactions involved, it is apparent that by suppressing the normal rate for the diborane reaction, some other set of reactions take place. They are not restricted to the formation of borohydride according to Equation 2, because an examination of the flask contents at this stage shows that while some borohydride is present, there is not enough to account for the amount of boron fluoride added. It is moreover known that some of the substances which are formed are highly unstable. If they are used while fresh as a part of the charge for the balance of the reaction, or as an inoculant for a fresh charge, they cause a substantial increase in the yield of borohydride. If they are permitted to stand for a day or so, even in the ice box, they lose their potency for this purpose, and may as well be discarded. Lithium borohydride, as such, does not appear to be the active principle, because pure crystals of this material, when charged into the flask, appear to favor diborane formation. It may be considered, from matters known at this time, that the active principle of the mass consists of one or more unstable molecules including atoms of the metal and the halide, as well as atoms of hydrogen and boron, and which acts in an autocatalytic manner to promote the reaction of Equation 2.

While it is known that the diborane reaction may proceed quantitatively at the boiling point of ether, or 35° C., it can not be said that this is a critical temperature above which the formation of borohydride is impossible. High temperatures favor diborane formation, while low temperatures suppress the action and enable the described alternative reactions to proceed. Too low a temperature appears to suppress all reactions, and therefore affects the efficiency of operation as measured by the time factor. A useful operating range appears to be from about 0° to 25° C. for the conditions under which this work has been done, but it is not intended to say that this range must be strictly adhered to.

As to the amount of boron fluoride presented to the hydride, only diborane may be expected if the molar ratio of the fluoride to the hydride is as high as one to three, and it is much better, from the viewpoint of recovery of borohydride, to hold this ratio to one to four or even lower. The halide should be added to an excess of hydride, because if the halide is in excess, the conditions then favor the formation of diborane, and so decrease the efficiency of operation.

The process of the present invention possesses several advantages over the previously known ways of making lithium borohydride, including the saving of time, the reduction of the amount of halide required, an elimination of the necessity of handling large amounts of the gaseous diborane. While many variations and modifications may be resorted to, it is believed that those practicing the invention will attain the best results by adhering to the procedure reflected in the following characteristic example.

A three necked reaction flask equipped with reflux condenser, stirrer, and dropping tube was charged with 25 grams of powdered commercial lithium hydride having an LiH content of 88.6%. To this was added 150 c. c. of ethyl ether to form a slurry, and the flask fas mounted in a bucket of kerosene, to which "Dry Ice" was later added as required to provide a cooling medium. As the slurry was stirred, a total quantity of 50 c. c. of ether-boron fluoride complex (B. P. 123°–126° C., sp. gr. 1.12) was added drop by drop from the tube over a period of thirty-five minutes. A reaction began with the addition of the fluoride, as evidenced by evolution of gas and refluxing of the ether. The time required for the addition of complex was determined by watching the condenser, so that about one drop returned to the flask per minute. Too rapid addition would have developed more heat, and caused the formation of greater quantities of diborane, which effects were sought to be avoided.

After about twenty more minutes, the contents of the flask suddenly surged, became very turbulent, and reacted much more violently. This effect was attended by the liberation of greater amounts of gas, and at that time Dry Ice was thrown into the cooling bucket, so as to reduce the temperature of the mixture to a range between 10° and 20° C. This served to suppress the vigorous reaction which had just commenced, and to restore the mixture to a condition of mild simmering and comparative quiet. Cooling was continued for approximately an hour, as it was known that if the flask contents were allowed to become much warmer, more diborane would be liberated in accordance with Equation 1, and the vigorous action would be resumed. At the end of the hour, the reaction subsided to a point where only an occasional bubble of gas was liberated, and at this time it was safe to discontinue cooling and allow the mixture to return to room temperature.

At this point, the discharge end of the reflux condenser was connected to a second flask containing about 20 grams of powdered lithium hydride in ether, the purpose being to recover such amounts of diborane as would subsequently be formed, by conversion to lithium borohydride. The system was flushed with nitrogen and allowed to stand overnight. Upon resumption of operations, a slurry of 200 grams of the lithium hydride in 1200 c. c. of ether was added to the flask, and a further quantity of 720 c. c. of complex was added from the tube over a period of 279 minutes. The cooling bath was again held between 10° and 20° C., the stirrer operated as before, and the addition of complex regulated by watching the reflux condenser. The reaction proceeded mildly, and without tendency toward the surge condition previously described, while the evolution of gas into the secondary flask, and its absorption therein, showed that relatively small amounts of diborane were being liberated.

The end point of the reaction was ascertained by observation of the time when the addition of further complex, at the same rate and under the same temperature conditions, produced increasing amounts of diborane gas. As this was detrimental to the efficiency of the desired reaction, further boron fluoride addition at this time would therefore have been pointless.

After the slurry had settled and clarified itself, the supernatant ether solution of borohydride was removed by siphoning and was transferred to an evaporating flask. The reaction residues were extracted three times with volumes of one and one-half liters of ether, and these extracts were also evaporated. A single extraction of the secondary receiver was made and added to the initial liquid therefrom for independent evaporation. As the liquids evaporated, a somewhat pasty mass of borohydride crystals precipitated, and these were taken to dryness by continuing the evaporation under vacuum at 80° C.

The recoveries were: from the main reaction chamber, 111.7 grams of lithium borohydride of 96.3% purity, and from the secondary receiver, 9.8 grams of lithium borohydride of 94.3% purity, or a total purity of over 95%, which can be taken as a good commercial product. Obviously, increased purity can be obtained by recrystallization. On the basis of starting with 200 grams total of pure lithium hydride, it will be seen that the recovery according to Equation 2 was approximately 80% of the theoretical, based on the amount of lithium hydride. The total yield of course was increased by recovering the diborane, liberated during the reaction, as borohydride.

With respect to this method of expressing reaction efficiency, it is believed proper to point out that the basis adopted is conservative. It can be readily calculated that, in accordance with Equation 2, each gram of lithium hydride should consume 3.98 c. c. of complex, while of course a greater amount is consumed according to Equation 1. A portion of the total hydride and halide charge entered into reaction (1) to form diborane, of which only that part liberated during the second stage of the operation was recovered. Another portion of the hydride was not consumed at all, because it was found present in the reaction flask after the borohydride extraction was completed, and because the total quantity of 770 c. c. were insufficient to satisfy the total amount of the hydride present.

When it is desired to operate on a more continuous scale, rather than on a small batch basis, the total yield values may be increased by using a portion of the flask residues, after borohydride extraction, as the inoculant for fresh charges, as the active principle appears to be present. It is not necessary to work initially with a small fraction of the hydride, as set forth in the example, because a faster procedure is to charge all the hydride into the flask, add a small amount of the inoculant and carry through the reaction directly, or else add a small amount of complex, form the promoter, and then continue without loss of time. Efficient operation employing these variations requires, however, a reasonable measure of skill on the part of the operator, and therefore it is believed advantageous to follow the procedure of the example until one has acquired familiarity with the invention. It will accordingly be seen that an expression of eighty per cent for a recovery factor represents a substantial completion of the reaction of Equation 2, and a high efficiency considering the conditions encountered.

The foregoing discussion has been predicated upon that procedure which has produced the best results, but it is not thereby intended to exclude from the scope of the invention less efficient modes of operation, or those modifications and variations which readily suggest themselves from the principles just considered. For example, reference has been made to ether as the liquid medium, because it has a low boiling point, is a solvent for the borohydride, and thus lends itself to the conduct of the process. Other liquids, however, may also be used. Accordingly, it is intended that the invention should not be restricted to the precise example given, but that it should be considered to have a scope commensurate with the context of the following claims.

I claim:

1. A method of making lithium borohydride by reacting lithium hydride with boron fluoride in the presence of an organic liquid which comprises adding a small amount of the fluoride to the hydride, cooling the mixture to such an extent that only limited amounts of gas are liberated, thereafter adding more fluoride, discontinuing fluoride addition when substantial amounts of gas are liberated, and finally recovering the borohydride from the reacted mixture.

2. A method of making lithium borohydride by reacting lithium hydride with boron fluoride which comprises forming a slurry of powdered lithium hydride and organic liquid, adding thereto in increments an amount of boron fluoride not greatly exceeding one quarter mole per mole of hydride, and subjecting the reacting mixture to cooling to a temperature at which only limited amounts of gas are liberated.

3. In the preparation of lithium borohydride by reaction between lithium hydride and boron fluoride, the steps comprising adding a small amount of fluoride to the hydride in the presence of an organic liquid, subjecting the mixture to cooling until it liberates only minor amounts of gas at room temperature, thereby to form an unstable composition, inoculating further quantities of hydride and fluoride with said unstable composition and allowing the hydride and fluoride to react, maintaining the temperature of the reacting mass sufficiently low that only limited quantities of gas are evolved, and limiting the amount of fluoride to less than 0.333 mole per mole of hydride.

4. A method of making lithium borohydride which comprises forming a slurry of lithium hydride powder in an organic liquid, adding thereto less than 0.25 mole of fluoride per mole of hydride, cooling the mixture to such an extent that only small amounts of diborane gas are liberated, and adding in increments further quantities of fluoride but less than 0.333 mole per mole of hydride while maintaining the temperature sufficiently low that only limited quantities of gas are evolved.

5. A method of making lithium borohydride which comprises reacting lithium hydride with a small amount of boron fluoride in the presence of an organic liquid, cooling the mixture to suppress the formation of diborane, thereafter adding in increments further quantities of fluoride but not greatly exceeding 0.25 mole per mole of hydride, and cooling the mixture to a temperature not greatly exceeding 35° C.

6. In a method of making lithium borohydride by reaction between lithium hydride and boron fluoride, the steps comprising forming a slurry of hydride particles in an organic liquid, adding less than 0.333 mole of fluoride per mole of hydride at such rate and at such temperature that only small amounts of diborane gas are liberated, discontinuing the addition of the fluoride at such time when further additions at the same rate and temperature produce increased amounts of gas, and thereafter recovering borohydride from the reacted mass.

7. In a method of making lithium borohydride by reaction between lithium hydride and boron fluoride, the steps comprising forming a slurry of the hydride in an organic liquid, adding thereto the fluoride at a temperature between zero and 35° C., discontinuing the fluoride addition when the amount thereof approximates 0.25 mole per mole of hydride present, and recovering the resulting borohydride from the reacted mixture.

8. A method of making lithium borohydride which comprises suspending particles of lithium hydride in ether, adding thereto less than 0.25 mole of boron fluoride, maintaining the reacting mass at a temperature below 35° C. and at which the mass continues to react without evolution of substantial amounts of diborane gas, allowing the mixture to reach a state of apparent equilibrium as measured by gas evolution, adding thereto further amounts of fluoride until gas evolution becomes pronounced, discontinuing the addition, and recovering from the reacted mass an ether solution of the borohydride.

9. In a method of making lithium borohydride by direct reaction between lithium hydride and boron fluoride, the steps which comprise suspending powdered lithium hydride in an organic liquid, slowly adding thereto less than one quarter mole of boron fluoride per mole of hydride, allowing the same to react but cooling the mixture to suppress the reaction to a rate at which only limited quantities of gas are evolved, adding in increments further quantities of fluoride to the mixture after the initial reaction has subsided, the total amount of fluoride added being substantially not greater than 0.25 mole per mole of hydride, continuing the reaction with cooling to limit the formation of diborane, and recovering the borohydride from the reacted mixture.

PAUL F. WINTERNITZ.

No references cited.